United States Patent
Schneider et al.

(10) Patent No.: US 6,477,238 B1
(45) Date of Patent: *Nov. 5, 2002

(54) LOOP CERTIFICATION AND MEASUREMENT FOR ADSL

(75) Inventors: Allan Schneider, Falls Church, VA (US); Frederick G. Hofman, Dowingtown, PA (US); James Everett Sylvester, McLean, VA (US)

(73) Assignee: Verizon Services Group, Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/660,395

(22) Filed: Sep. 12, 2000

Related U.S. Application Data

(63) Continuation of application No. 09/234,464, filed on Jan. 21, 1999.

(51) Int. Cl.[7] .......................... H04M 1/24; H04M 3/08; H04M 3/22
(52) U.S. Cl. .................. 379/22.04; 379/1.03; 379/1.04; 379/22.02; 370/248; 370/249
(58) Field of Search ............................... 379/1.03–1.04, 379/22.01, 22.02, 22.03, 22.04, 22.07, 25, 26.01, 27.01, 27.02, 27.03, 15.03, 29.08, 30; 324/527–528, 532–534, 523, 525, 537, 541, 549, 76.12, 76.19, 76.21; 370/248–249

(56) References Cited

U.S. PATENT DOCUMENTS

| | | | |
|---|---|---|---|
| 5,181,198 A | * | 1/1993 | Lechleider |
| 5,870,432 A | * | 2/1999 | Kerckhove |
| 6,215,855 B1 | * | 4/2001 | Schneider |

OTHER PUBLICATIONS

Farhang–Boroujeny et al, An eigen–approach to the design of near–optimum time domain equalizer for DMT transceivers, Copyrighted 1999, IEEE, pp. 937–941.*

* cited by examiner

*Primary Examiner*—Duc Nguyen
(74) *Attorney, Agent, or Firm*—Leonard C. Suchyta; Loren C. Swingle; Glenn E. Forbis

(57) ABSTRACT

The present invention involves a transmission of a known signal over a line intended for a digital subscriber line (xDSL) service, measurement of a resulting waveform received through the line and processing of the received signal to derive a set of eigenvalues characterizing the transfer function of the line. In the preferred embodiment, a transmitter applies a known test signal waveform to the transmission line. The test signal corresponds to a desired one of several available xDSL services. At the receiving end of the line, the output signal from the line is sampled, to capture a digitized sample waveform for the received signal. A computer processes the captured waveform to determine eigenvalues characterizing the transfer function of the line with respect to the one service. If the eignevalues for the line bear predetermined relationships to threshold values, indicating acceptable line transfer function for the desired xDSL service, then the invention certifies the tested line for use on that service.

9 Claims, 6 Drawing Sheets

LOOP CERTIFICATION AND MEASUREMENT FOR ADSL

This application is a continuation of application Ser. No. 09/234,464 filed Jan. 21, 1999.

TECHNICAL FIELD

The present invention relates to a technique for measuring the performance of wire pairs used for high speed digital subscriber line (xDSL) services, for example for Asymmetrical Digital Subscriber Line (ADSL) services and the like. The measurement technique enables a network carrier to test a line. typically a twisted-wire copper pair, to determine if the line characteristics will permit a particular level of digital service. The carrier can then certify the line for that service.

ACRONYMS

The written description uses a large number of acronyms to refer to various services and system components. Although generally known, use of several of these acronyms is not strictly standardized in the art. For purposes of this discussion, acronyms therefore will be defined as follows:

ADSL—Asymmetrical Digital Subscriber Line
ATM—Asynchronous Transfer Mode
ATU-C—ADSL Terminal Unit-Central Office
ATU-R—ADSL Terminal Unit-Remote
CO—Central Office
CP—Customer Premises
CPU—Central Processing Unit
DSL—Digital Subscriber Line
DSLAM—Digital Subscriber Line Access Multiplexer
EEPROM—Electronically Erasable/Programmable Read Only Memory
EOC—Embedded Operations Channel
HDSL—High data rate Digital Subscriber Line
I/O—Input/Output
IP—Internet Protocol
ISDN—Integrated Services Digital Network
LAN —Local Area Network
LCD—Liquid Crystal Display
MDF—Main Distribution Frame
MLT—Mechanized Loop Test
MPEG—Moving Pictures Experts Group digital encoding
NID—Network Interface Device
PC—Personal Computer
POTS—Plain Old Telephone Service
QoS—Quality of Service
R—Ring
RAM—Random Access Memory
ROM—Read Only Memory
SMDS—Switched Multi-Megabit Data Service
T—Tip
TCP—Transmission Control Protocol
TLS—Total Least Squares
VDSL—Very high data rate Digital Subscriber Line
xDSL—Generic class of Digital Subscriber Line Services

BACKGROUND

Modern society continues to create exponentially increasing demands for digital information, and the communication of such information creates increasing needs for ever-faster data communication speeds. The most common form of computer-to-computer communication in use today relies on modems and analog telephone network connections. The telephone network, however, was designed to provide approximately 3.3 kHz of analog voice bandwidth. Such a bandwidth provides adequate voice communication, at low cost, but does not support high-speed data communications. Integrated Services Digital Network (ISDN) offers somewhat faster data communications and the capacity for concurrent data and voice telephone services. However, this technology has some drawbacks, and data rates offered by ISDN already may be too slow. The high-speed and wide availability of modem personal computers (PCs) continually gives rise to ever more sophisticated multimedia applications. Communications for such applications, typically between the PC and the Internet, are driving the need for speed to rates far above those available on analog telephone lines and on normal ISDN lines.

A number of technologies are being developed and are in early stages of deployment, for providing substantially higher rates of data communication, for example ranging form 640 kb/s to 9 Mb/s. Of particular note, after considering several other options, a number of the local telephone carriers are working on enhancements to their existing copper-wire loop networks, based on various xDSL technologies. xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL related service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'.

For digital data communication purposes, the ATU-C and ATU-R modem units create at least two logical channels in the frequency spectrum above that used for the normal telephone traffic. One of these channels is a low speed upstream only channel; the other is a high-speed downstream only channel. Two techniques are under development for dividing the usable bandwidth of the telephone line to provide bidirectional transmission. Currently, the most common approach is to divide the usable bandwidth of a twisted wire pair telephone line by frequency, that is to say by frequency division duplexing. The frequency division approach uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. The other approach uses Echo Cancellation. With Echo Cancellation, the upstream band and the downstream band substantially over-lap. The modems separate the upstream and downstream signals by means of local echo cancellors, in a manner similar to that used in V.32 and V.34 modems.

The telephone carriers originally proposed use of ADSL and similar high-speed technologies to implement digital video services, for example in networks sometimes referred to as video 'dialtone' networks. The ADSL line technology provided a mechanism for high-speed transport of MPEG encoded video information to video terminal devices in the customers' homes. Examples of such ADSL-based video dialtone networks are disclosed in U.S. Pat. Nos. 5,247,347, 5,410,343 and 5,621,728. Interest in such video services has waned, but the recent explosion in Internet and other PC-based services has sharply rekindled the carriers' interest in xDSL technologies. The carriers are now proposing a range of xDSL data services targeted at high-speed Internet access and high-speed access to private data networks. U.S. Pat. No. 5,790.548 to Sistanizadeh et al. discloses an example of an ADSL based data network, e.g. for high-speed access to the Internet and to corporate LANs.

In the last year or so, considerable attention has focused on one version of ADSL with somewhat reduced capabilities but which does not require a separate splitter/combiner at the customer premises to segregate the telephone traffic from the data traffic. The ADSL 'Lite' modem can plug directly into the customer's telephone wiring, without a special installation by a telephone company technician. The customer's 'Lite' modem does not need or include a frequency splitter/combiner to segregate the voice and data traffic. The 'Lite' modem uses a more restricted frequency band, in order to reduce interference with telephone service. Although this reduces the downstream data rate somewhat, particularly for longer lines, the 'Lite' implementation still provides downstream speeds ranging from 640 b/s to 1.5 Mb/s, which are substantially higher than provided by analog modems or ISDN.

Thus, ADSL modems today are providing downstream data rates in ranges from 640 kb/s to as high as 9.1 Mb/s. The precise data rate depends on many factors, such as line length, copper wire gauge, cross-coupled interference, and the like. As a general rule, the shorter the distance, and/or the smaller the wire gauge, the higher the rate can be on the particular telephone line. These rates provide an order of magnitude improvement over telephone line modems and ISDN equipment currently used for Internet or other data network access services.

Installation, operation and maintenance of ADSL-based data services, however, pose a number of problems. These problems may be particularly acute where a carrier is considering upgrading service to ADSL on an existing subscriber's line circuit. As noted, the length and gauge of the wiring can effect performance. If the wiring has been in place and used for telephone service, there may be load coils on the line, which disrupt xDSL services. Bridged-taps, which are common in telephone loop plant, also cause performance problems.

In the telephone industry, twisted wire pair circuits from a central office or a subscriber line carrier unit generally are bridged-tapped along their length, to provide a line appearance in a number of different terminals located at different points along the multi-pair feeder cable. An installer can connect a subscriber's drop line to binding posts in the closest terminal, but the line appearance remains in other terminals connected to the multi-pair cable. At a later date, an installer can disconnect the first subscriber drop line from the one terminal, and connect a new subscriber's drop line from another terminal, in order to reuse the twisted wire pair connection through the feeder cable back to the central office for another subscriber. The presence of bridged-tapping, particularly extended wiring downstream of a particular subscribers connection to twisted wire pair in a terminal, may cause considerable disruptive interference effects. For example, the extending wiring adds capacitance and resistance. The extended wiring picks up considerable electromagnetic interference from external sources and may pick up cross talk from adjacent active pairs. All of these effects disrupt xDSL broadband digital service on the twisted wire pair.

To install and operate an xDSL modem on a line, the telephone carrier needs to know if the line is in such a state as to enable high-speed downstream transmission at the full rates desired for the particular xDSL service. If not capable at the highest rate, it is useful to determine what lower rate the line may support. The carrier company can take a number of different steps, if it knows the line capabilities. For example, the carrier may rearrange its line connections to provide a subscriber desiring a particular xDSL service with an adequate line pair.

At present, however, there is no adequate technique for testing loop plant wiring, particularly existing telephone wiring, for its compatibility with the high-speed data services. Often, the carrier must install the modems for the desired service, operate the modems and pray they work. If there are problems, there is no easy way to measure or diagnose specific problems. The carrier's technicians can try a number of different fixes, on a hit-or-miss basis, and retest the modem operations. Such approaches to testing are time consuming and often ineffective.

Many carriers today utilize a mechanized loop test (MLT) system, for analyzing reported troubles on subscribers' telephone lines. An MLT system selectively connects to the central office terminals of twisted pair telephone wiring and conducts electrical tests on metallic circuits. Such a system can apply an AC voltage across a wire pair, between the Tip (T) wire and ground, and between the Ring (R) wire and ground and take appropriate measurements to determine characteristic impedances. The MLT system can also measure the DC resistance between the wires and between each wire and ground. The MLT system stores a list of DC and AC resistance/impedance values that correspond to certain line conditions, e.g. shorts, opens, normal telephone set connections, etc. The MLT system makes decisions as to presence or absence of different types of faults by comparing the test result values to its stored list of values. These MLT tests provide limited information regarding the transfer characteristic of the loop, particularly with respect to the frequency ranges effecting xDSL services.

A need therefore exists for an efficient technique for testing a line to certify the line for a particular high-speed data service, like ADSL, before putting the line into service. A need also exists for a technique to enable testing and maintenance of in-service lines, to enable the carrier to respond to troubles and outages reported by subscribers.

SUMMARY OF INVENTION

The present invention addresses the above stated needs by providing transmission line measurements and processing of measurement results, to determine at least one eigenvalue and preferably a plurality of eigenvalues, for a line intended for a digital service. The eigenvalues characterize the transfer function of the line as a data communication medium. Comparison of the one or more values to one or more standard threshold values can be used to determine operability for a particular grade of digital service.

Thus, a first aspect of the invention relates to a method of testing a transmission line for a selected one of several digital subscriber line services. The method includes selecting one waveform, corresponding to the particular digital subscriber line service, from waveforms corresponding to a number of such services. The selected waveform is transmitted through the line to a receiving end of the line. The test involves sampling and capturing a waveform from the receiving end of the transmission line and processing samples of the captured waveform to produce a set of eigenvalues characterizing a transfer function of the transmission line.

The preferred embodiment compares each of the eigenvalues (possible complex) to a predetermined (possibly complex) threshold value. The thresholds represent an acceptable transfer function of a transmission line with respect to the selected digital subscriber line service. If each of the eigenvalues, bears a predetermined relationship to the respective threshold value, for example, if the eigenvalue exceeds the threshold, then it is possible to certify the transmission line for carrying the selected digital subscriber line service.

In a typical example, a customer would ask an exchange carrier for a particular grade of digital service. The carrier's technician would test the line, as outlined above. The testing produces a number of eigenvalues. If the eigenvalues from the test bear the appropriate relationship to corresponding thresholds associated with the particular grade of digital service, the test indicates an acceptable condition of the line for that service. The carrier's technician can certify the line, and the carrier can provide the customer the digital service over the particular line.

The inventive method may be applied to lines of a variety of telecommunications networks that carry digital data services. The preferred embodiments utilize the inventive testing and certification technique to certify telephone lines, typically twisted pair type subscriber lines, for xDSL services. Examples of the xDSL services discussed in detail include asynchronous digital subscriber line (ADSL) services, such as the new splitterless ADSL service.

Another aspect of the invention involves a system for testing a line of a communication network for a digital subscriber line service. The system includes a test waveform generator, for connection to a transmit-side of the line. A waveform sampler, for connection to a receive-side of the line, samples a test waveform received through the line from the generator. A processor, coupled to the waveform sampler and responsive to the sample of the test waveform, determines a set of eigenvalues. These values are representative of the transfer function of the transmission line. The processor compares the eigenvalues to threshold values, which correspond to an acceptable transfer function of the line.

In the preferred embodiment, the waveform sampler and the processor are elements of a test unit coupled to the receiving end of the transmission line, preferably on the network end of the line. A storage device stores sets of threshold values for a number of services. The processor processes a set of samples for a test waveform corresponding to a selected one of the digital subscriber line services and processes the captured digital samples. From this processing, the processor typically determines two or more eigenvalues representing the transfer characteristic of the line with respect to the selected digital subscriber line service. The processor compares the eigenvalues to a selected set of threshold values. The selected set of threshold values corresponds to an acceptable transfer function for the selected digital subscriber line service.

The preferred embodiment of the test unit is built around a computer system. The system includes a keyboard or the like for input as well as a display. Under software control from the processor, the keyboard and display provide a user interface for a technician to control the test operations. For example, the processor drives the display to show results of the comparison of the eigenvalues to the selected set of threshold values. The displayed results show whether or not a line can support a desired digital subscriber line service. If so, then the technician can certify the line for the customer's use and subscription to the particular digital service. If not acceptable, the relationship of the eigenvalues to the threshold values may provide information useful to the network operator, for example to facilitate repairs.

The testing of the invention may apply to transmissions in either direction on a subscriber line. For an ADSL service, for example, the technician would at least test for the broadband communications, the downstream transmission toward the customer premises. The transfer function of twisted wire pair is the same in each direction, so the broadband test actually may use a test signal transmission from the customer premises to a test unit on the central office or network end of the line. A disclosed implementation also tests the transfer characteristic of the line with respect to the upstream transmission for the ADSL service. Alternatively, for prescribed services, upstream eigenvalues might be inferred for a downstream eigenvalue.

The present invention thus provides an efficient, effective technique for testing a line of a communication network. The test provides information that specifically relates to the ability of the line to transport the signals for a selected digital subscriber line service.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The present invention involves a transmission of a prescribed signal over a line, measurement of a resulting waveform received through the line and processing of the transmitted and received signals to derive eigenvalues representation of the transfer characteristics of the line.

At the transmit-end of the line, a known test signal waveform is applied to the transmission line. The test signal corresponds to a desired xDSL service. At the receive-end of the line, the output signal from the line is sampled, to capture a digitized sample waveform for the received signal. A computer processes the captured waveform, to determine the transfer function of the transmission line. The waveform of the test signal represents known parameters, and the relationship of the received signal to the known parameters represents a measure of the impact of the line transmission characteristics on the known signal.

In mathematical terms, an operator "operates" on a function and produces another function. For every operator, there is a collection of functions which, when operated on by the operator produces the same function, modified only by a constant factor. Such a function is called an eigenfunction of that operator. The constant factor is the eigenvalue of that eigenfunction.

In accord with the invention, the computer processes the captured waveform to determine at least one and typically a plurality of eigenvalues, which are representative of the measured transfer function of the tested line. If the eigenvalues for the line bear predetermined relationships to threshold values, indicating acceptable line characteristics for the desired xDSL service, then the invention certifies the tested line for use on that service. If the eigenvalues do not relate to the thresholds in the desired manner, the precise divergence from the thresholds may provide information that is useful in diagnosing the problem(s).

Figure 1:
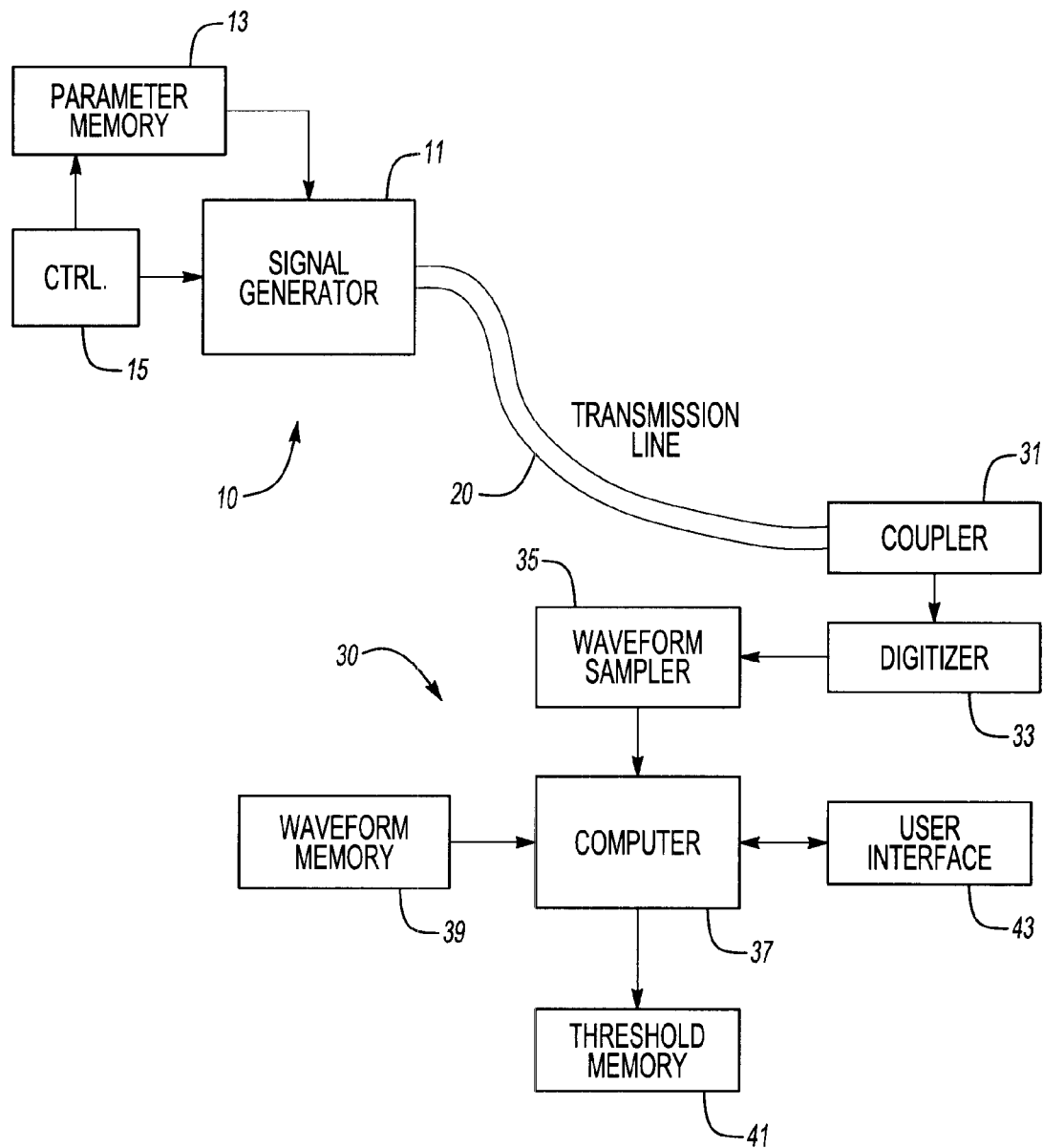
FIG. 1 is a simplified functional block diagram of a system for certifying a transmission line for an xDSL service by measuring eignevalues for the line, in accord with the invention.

FIG. 1 depicts a system for testing and certifying a line for xDSL service, in accord with the invention. The simplified embodiment illustrated performs tests of the transmission characteristics in one direction over the line, for example, for the broadband transmission from the network side downstream to the customer premises, for an ADSL service or the like.

The test system shown includes a first unit 10 at the transmit-end of the line 20 and a second unit 30 at the receive-end of the line 20. In this simple embodiment, the unit 10 is a transmitter, and the unit 30 is a receiver. For xDSL type testing operations, the transmission line typically will be a twisted wire pair, formed of two insulated copper conductors. Persons skilled in the art, however, will recognize that the inventive testing may be applied to other lines or media that will carry digital communications, such as coaxial cable links.

The transmitter unit 10 includes a signal generator 11. A memory 13 stores waveform parameters for a number of available test signals. Each available test signal corresponds to one of the xDSL services for which the system may perform line testing and certification. The transmitter unit 10 also includes a controller 15. The controller 15 controls the parameters supplied to the signal generator 11 and controls the generator, to enable selection of the actual waveform generated to correspond to a particular desired service.

For example, a technician might instruct the controller 15 to generate a test waveform corresponding to an ADSL service. The controller 15 causes the memory 13 to supply the appropriate waveform parameters, and in response, the signal generator 11 outputs a precise test waveform. The generator 11 is coupled to the transmission line 20, and the line carries the test waveform to the receiver unit 30.

The receiver unit 30 includes a coupler 31. The coupler 31 provides physical and electrical interconnection to the transmission line 20, to enable reception of the waveform signal from the particular medium of the line, for example, from a twisted wire pair. A digitizer 33 samples the waveform on the line, and waveform sampler 35 captures the digitized signals for a complete waveform representative of the signal received from the transmission line 20. The sampler 35 supplies the digital waveform signal to a computer 37, for further processing.

As discussed in more detail below, the computer 37 executes a procedure to calculate eigenvalues for the line transfer function from the received waveform. A preferred procedure is summarized below. The channelization theory and formulas involved in eigenvalue calculations for channel transfer functions are described in detail in Proakis, *Digital Communications*, $2^{nd}$ Edition, © 1988, McGraw-Hill, pp. 551–578. An alternative procedure using the received waveform and a sample of the test waveform is a total least squares (TLS) procedure similar to that disclosed in Rahman & Sakar, "Deconvolution and Total Least Squares in Finding Impulse Response of an Electromagnetic System from Measured Data," IEEE Transactions on Antennas and Propagation, vol. 43, no. 4, April 1995, pp. 416–421. The disclosures of the Proakis text and the Rahman and Sakar article are incorporated entirely herein by reference. Through either procedure, the computer 37 determines the eignevalues for the response characteristic of the line 20 that is currently under test.

If desired to facilitate TLS processing computer 37 may also receive a sample of the original input waveform. This could be a measured sample, but in the illustrated embodiment, a memory 39 stores samples of the input waveforms for the various xDSL services. During system calibration, the generator 11 generates the test waveform signals for all of the xDSL services. The generated test signals are digitized, sampled and stored in memory 39. Other procedures may be used to store adequately accurate test waveform samples in the memory 38. During test processing, the computer 37 obtains the appropriate waveform sample from the memory 39.

The computer 37 also connects to a memory 41. The memory 41 stores threshold eigenvalues representing of acceptable transfer characteristics of transmission lines, for the different xDSL services. The thresholds are set based on laboratory testing using the associated xDSL modems. To certify a line as acceptable for the desired xDSL service, the computer 37 retrieves the threshold values for the appropriate service from the memory 41 and compares those values to the eigenvalues derived from the testing operation.

If the eigenvalues bear a desired relationship to the thresholds, for example, exceed all of the thresholds, the computer provides an indication of acceptability (possibly for a presented Quality of Service or QoS) via a user interface 43. In a typical computer implementation, the user interface comprises a keyboard, a mouse or the like and a display device such as a CRT monitor. In such an implementation, the computer displays the certification results on the monitor.

Figure 2A:
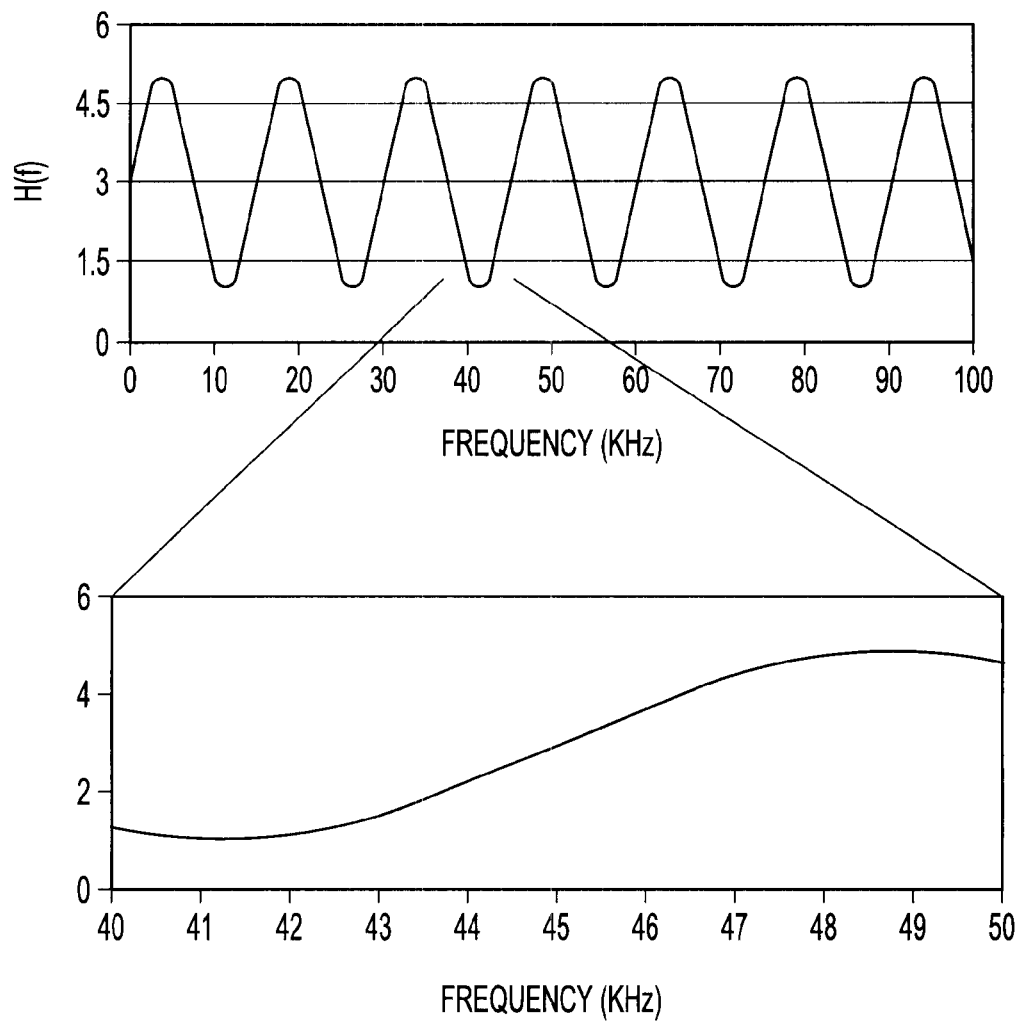
FIGS. 2A to 2F are a series of graphs helpful in understanding a calculation of eigenvalues for loop testing.
Figure 2B:
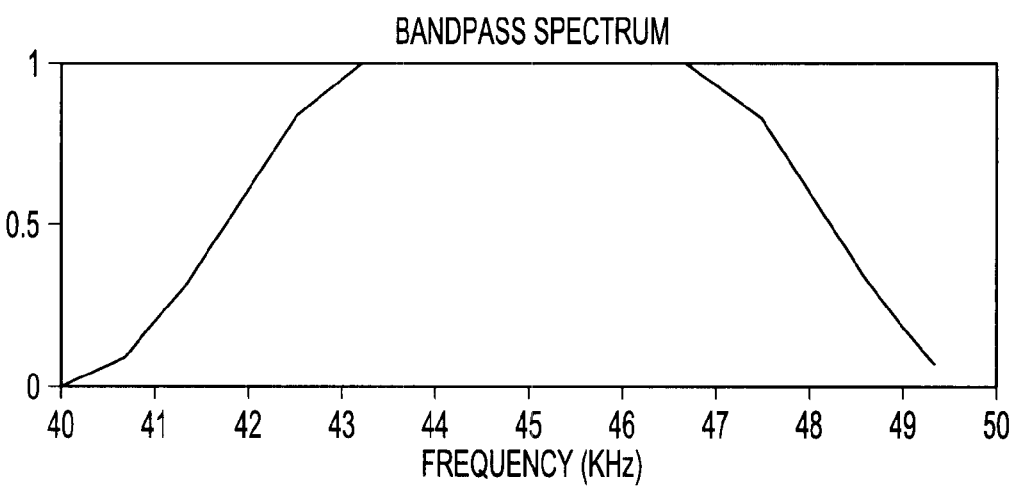

One methodology for calculating the channel eigenvalues can be illustrated by considering the following much simplified example. This example, conjured more for the tractability than for realism, presupposes that the unknown transmission line (loop) transfer function H(f) is sinusoidal within the frequency band 0–100 KHz, as shown in FIG. 2A. Assume a need to test a narrow band of 40–50 KHz, for purposes of this simplified example. The xDSL signal, and therefore so too the test waveform, are presupposed (for this example) to have a raised-cosine power spectral density strictly bandlimited between 40 and 50 KHz, as shown in FIG. 2B. Those skilled in the art will recognize that a broader band test signal would be used to test a wider portion of the spectrum, e.g. to match one or more of the ADSL channels.

Figure 2C:
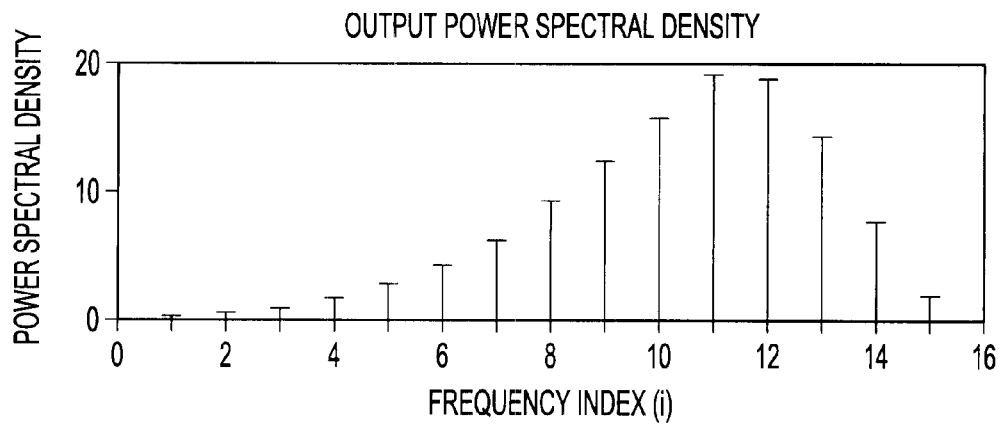
Figure 2D:
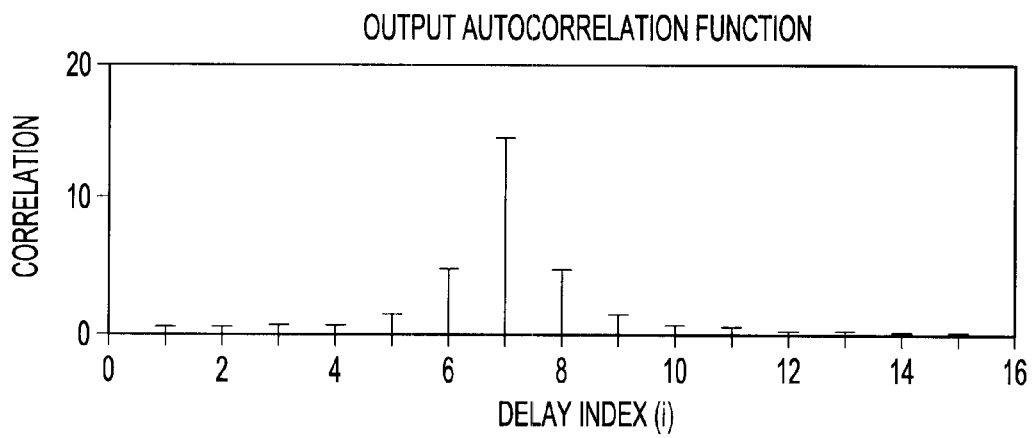

Calculation of the channel eigenvalues begins with the calculation of the autocorrelation function of the received signal at the output of the transmission line. [Proakis, Equation (6.3.8)]. In the preferred embodiment, this function is calculated by summing appropriately lagged products at the output of a Sample. In this illustrative example, the calculation is expedited by taking the (fast) Fourier transform of the (sample, low-pass equivalent, normalized) power spectral density at the output of the transmission line [Proakis, Equation (1.2.28)]. If the calculations are further expedited by using only sixteen ($2^4$) frequency samples across the 10 KHz band, then the digitized output power spectral density essentially appears as shown in FIG. 2C and the autocorrelation appears as an FIG. 2D.

Figure 2E:
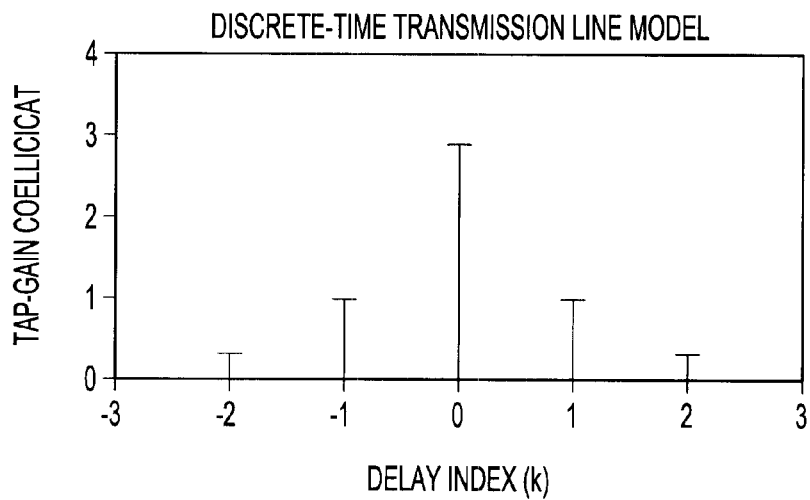

The autocorrelation function is assumed to be zero for $|i-7|>L$, where L is some arbitrary positive integer. For this illustrative example, L has been determined by setting the autocorrelation function to zero for all indices beyond the neighborhood of its maximum where the correlation falls more than 10 decibels below its maximum for the first time. Consequently, L=3 the tap-gain coefficients of the equivalent discrete-time mode are shown in FIG. 2E.

Figure 2F:
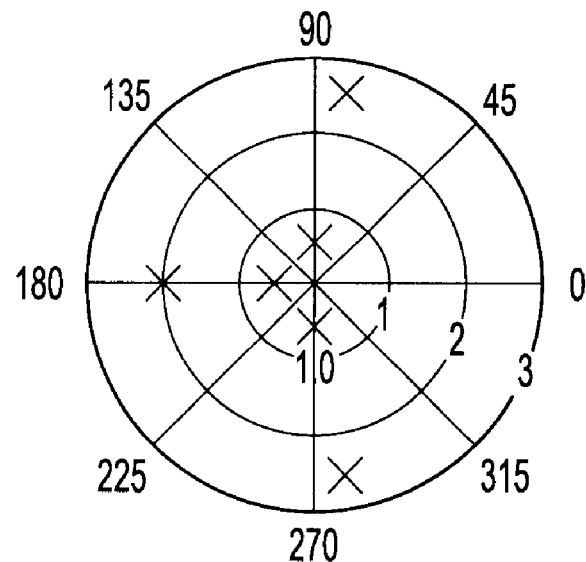

The tractability of the Discrete-Time Transmission Line Model can be enhanced by introducing a noise-whitening filter. Recognizing that the tap-gain coefficients serve as to define the (two-sided) z-transform of the sampled autocorrelation function of the received signal at the output of the transmission line [Proakis, Equation (6.3.13)], the 2L roots of the sampled auto-correlation function can be found as shown in FIG. 2F.

The minimum-phase noise-whitening filter is defined by complex roots lying within the unit circle; therefore, the derived equivalent discrete-time model of the transmission line [Proakis' Equation (6.3.15)] has the (normalized) tap-gain coefficients.

$$\alpha^T = (0.938\ 0.327\ 0.09\ 0.075) \tag{1}$$

The correlation sequence of the equivalent discrete-time model of the transmission line is given by Proakis' Equation (6.3.17):

$$x_k = \sum_{n=0}^{L-k+1} a_n \cdot \overline{a_{k+n}} \tag{2}$$

The channel covariance matrix of the equivalent discrete-time model of the transmission line is given by Proakis' Equation (6.4.33):

$$\Gamma_{i,j} = if(|j-i|>L, 0, if(i<j, x|_{j-i}, if(i>j, \overline{x|_{i-j}}, x|_{i-j}|+N_0))) \tag{3}$$

where $N_0$ is the channel model's noise power spectral density and reciprocal of the receive signal-to-noise ratio. For practical xDLS transmission channels, $N_0$ is usually negligible; then, for this illustrative example, $$x = \begin{pmatrix} 1 \\ 0.343 \\ 0.109 \end{pmatrix} \tag{4}$$

$$\Gamma = \begin{bmatrix} 1 & 0.343 & 0.109 & 0 & 0 \\ 0.343 & 1 & 0.343 & 0.109 & 0 \\ 0.109 & 0.343 & 1 & 0.343 & 0.109 \\ 0 & 0.109 & 0.343 & 1 & 0.343 \\ 0 & 0 & 0.109 & 0.343 & 1 \end{bmatrix}$$

The channel eigenvalues are determined from $\Gamma$ to be:

$$\lambda^T = (0.529\ 0.598\ 0.857\ 1.293\ 1.723) \tag{5}$$

Persons skilled in the telecommunications art will recognize that the present invention is applicable to line testing for a number of different types of lines and for a number of different digital services that such lines may transport. Thus, the inventive testing and certification techniques readily apply to a wide range of networks. However, to fully appreciate the advantages of the invention, it may be helpful to consider application of the invention to a specific network for certification of a specific service, as a detailed example.

Figure 3:
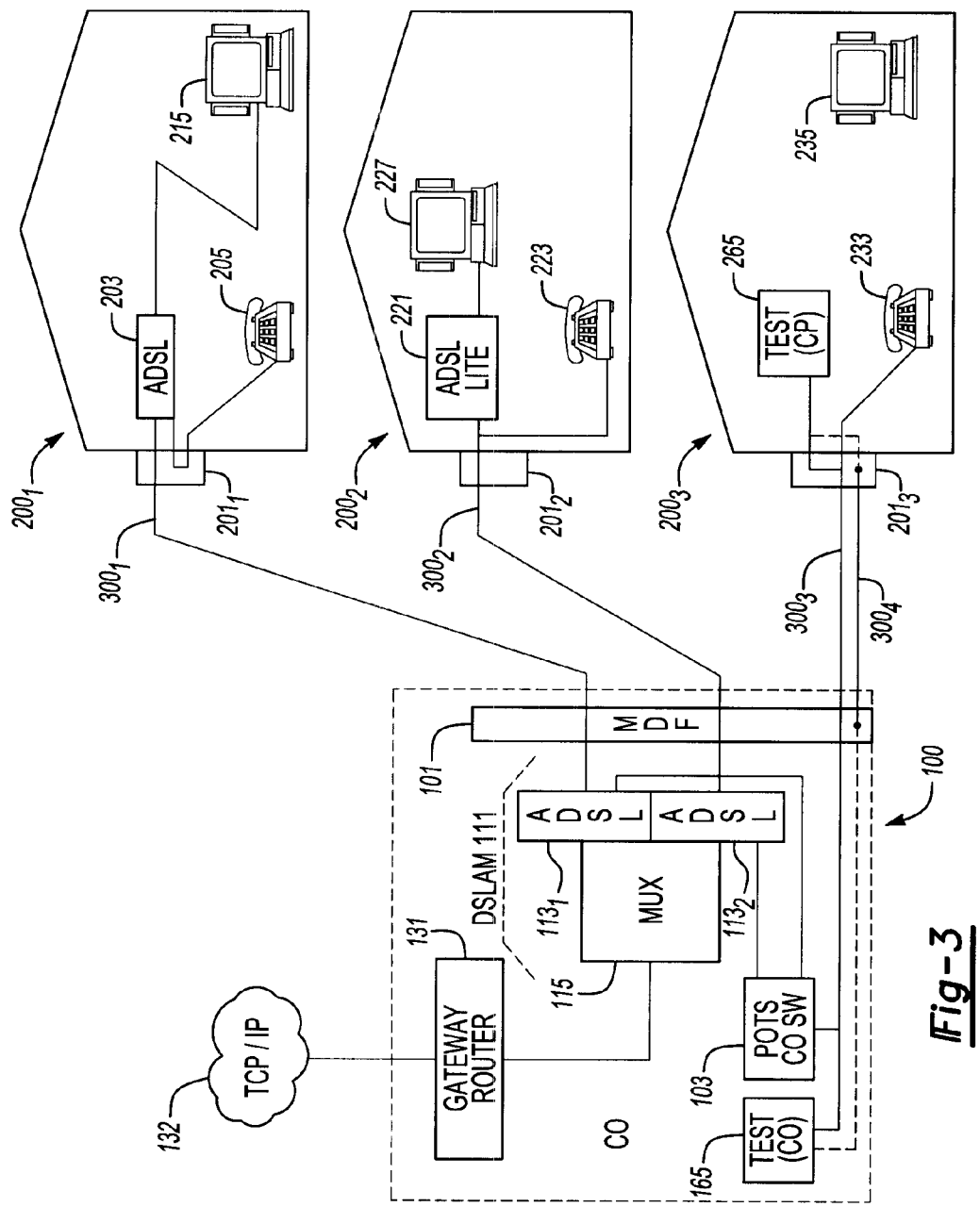
FIG. 3 is a functional block diagram, depicting an example of a local carrier's telephone and data network incorporating the line testing and certification in accord with the present invention.

FIG. 3 illustrates an example of one type of telephone and data network, which may utilize the line testing and certification in accord with the present invention. An example of a generally similar network is disclosed in commonly assigned application U.S. Pat. No. 5,790,548.

The end-user may be a single PC user or a small business or a residential LAN user. The customer access comprises an xDSL twisted pair. In the illustrated embodiment, the network supports standard ADSL, now sometimes referred to as "ADSL-Heavy" and the splitter-less consumer version of ADSL commonly referred to as "ADSL-Lite". The ADSL-based local access network provides access to the Internet, to corporate local area networks (LANs), and the like. The high speeds available through the local network enable a wide range of communications, for example, of text data, of video data, for multimedia, for web browsing, transfers of files, database searching, and the like.

As shown in FIG. 3, a central office (CO) 100 provides plain old telephone service (POTS) and digital subscriber line data service for a number of customers. For purposes of discussion, assume that the equipment at the various customer premises 200 connect directly to the CO 100 via twisted pair type copper wiring 300. In an actual implementation, many customers may connect through such wiring to a remote terminal linked to the CO via optical fiber.

For purposes of discussion, the drawing shows three customer premises 200. Each customer subscribes to plain old telephone service (POTS). At customer premises $200_1$ the customer also subscribes to a full ADSL service, whereas the customer at premises $200_2$ subscribes to an ADSL-Lite service. The network may- support a variety of other xDSL services. Assume, however, that the customer at the lower premises $200_3$ is seeking to add an ADSL service, and the carrier needs to test and certify a line to those premises for the desired service. As discussed more later, the test units 165, 265 selectively connect to one or more lines going to those customer premises.

In the CO 100, each customer's line connects to appropriate network equipment through a main distribution frame (MDF) 101. For telephone service, the CO 100 includes a normal POTS switch 103. Since the third customer currently subscribes only to POTS telephone service, the customer's line $300_3$ connects through the MDF 101 to a line card within the normal POTS switch 103. The switch 103 routes calls to and from the line $300_3$, in the normal manner.

The lines 300 for the other customers, however, connect through the MDF 101 to a Digital Subscriber Line Access Multiplexer (DSLAM) 111. The DSLAM includes a bank of ADSL terminal units 113 and a multiplexer/demultiplexer (MUX) 115. More specifically, within the DSLAM 111, each customer line 300 connects to an assigned ADSL terminal unit 113 in the central office (ATU-C). In the example illustrated, the first customer's line $300_1$ connects through the MDF 101 to a first ADSL terminal unit $113_1$ in the CO 100. The second customer's line $300_2$ connects through the MDF 101 to a second ADSL terminal unit $113_2$ in the CO 100. The ADSL units 113 include appropriate frequency dependent combiner/splitters, for segregating out the voice telephone traffic. Thus each ADSL unit 113 provides a connection for telephone traffic from the associated line 300 to the POTS switch 103.

Each ADSL terminal unit 113 supports at least the one ADSL service, to which the customer subscribes. For example, the unit $113_2$ at least supports the ADSL-Lite service. Many xDSL units 113 selectively support two or more services. For example, some vendors units intended for the full or "heavy" ADSL service can also alternatively send and receive the more limited signals for the "Lite" service.

The ADSL units 113 essentially act as modulator/demodulators (modems) for sending and receiving data over the subscriber telephone lines 300. On the network side, each of the ADSL units 113 connects to the MUX 115. The MUX 115 multiplexes and demultiplexes the upstream and downstream data for the ADSL modems 113 and provides a high-speed link a router 131.

The router 131 acts as the gateway to a wide-area network illustrated as a data network 132, for example providing packet switched TCP/IP communications. The TCP/IP communication may ride on an SMDS network.

The SMDS (Switched Multi-Megabit Data Service) network provides fast, packet-switched access to equipment of Internet service providers and to private intra-networks operated by corporations and the like. It should be understood that SMDS 13 is simply an example, and that the backbone network 132 may be utilize frame relay or asynchronous transfer mode (ATM).

For the data customer, the network provides a full-time dedicated connection intended to be active or "on" at all times. The very first packet sent by a customer premise computer goes to the router 131, which reads the Internet Protocol (IP) address in the packet, determines that it is desired to set up a session, and commences the steps to establish a session to the appropriate destination through the network 132.

Consider now several examples of customer premises equipment and wiring, for telephone and data services available from the network.

At the customer premises $200_1$, the copper loop $300_1$ carrying both the POTS and ADSL signals connects through a Network Interface Device (NID) $201_1$ placed at the side of the home. A two pair loop is installed from the NID to the location where the ADSL unit 203, typically an ATU-R modem, is located in the home. One pair connects all of the signals on the line $300_1$ from the NID $201_1$ to the ADSL modem 203. Within the ATU-R type modem 203 of the full or "heavy" ADSL service there is a passive splitter/combiner type filter, which segregates the POTS signal and the data signals. The POTS signal is then transmitted over the second twisted pair back to the NID $201_1$. The POTS line is then connected to the in-home wiring extensions at the NID $201_1$, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 also sends data to the ADSL modem 203. The modem 203 modulates the upstream data and transmits appropriate signals over the line $300_1$ to the modem $113_1$ in the CO 100. The ATU-R interface may support bridging, such that multiple users can share the NIB on the ADSL modem 203, for two-way data communication through the CO 100.

At the customer premises $200_2$, the copper loop $300_2$ carrying the POTS and ADSL signals again connects through the NID $201_2$ placed at the side of the home. For the 'Lite' installation, however, there is no need for a splitter and combiner. Both the POTS signal and the ADSL signal are transmitted over the twisted pair in-home wiring to the ADSL-Lite modem 221 and to one or more standard telephone devices 223 in the home.

Within the ADSL-Lite modem 221, the downstream coded ADSL signal is demodulated and decoded back to an appropriate data interface protocol and supplied to the PC 227. In the upstream direction, the ADSL-Lite modem 221 modulates data for transmission in the appropriate frequency range over the twisted pair line $300_2$ to the ADSL modem $113_2$ in the CO 100.

The customer at premises $200_3$ presently has only a telephone service. As such, the line $300_3$ connects through the NID $201_3$ and the customer premises wiring to one or more pieces of standard telephone equipment 233. The customer may have a computer 235, but for this example, assume that the computer is not yet connected to the data network. The customer has asked for an xDSL service, such as ADSL or ADSL-Lite.

The first option is to add the xDSL service to the active subscriber's telephone line $300_3$, if practical. Existing loop plant facilities maintained by local telephone carriers typically include additional copper pairs that are not in use. Spare wiring typically is available at least from the NID on the customer premises to the nearest terminal of the carrier's feeder cable bundle. In many cases a spare pair shown for example at $300_4$ may actually extend all the way through the feeder cable(s) and the customer's drop cable to the customer's premises. To provide the customer the desired xDSL service, the carrier needs to test and certify one of the wire pairs $300_3$, $300_4$ to the customer premises $200_3$.

To test and certify a line, using the illustrated embodiment of the invention, a carrier technician connects test unit 165 to the central office end of the line under test. Initially, a technician might manually connect the test unit 165 at the CO to the CO-end of the line, for example, using jumper connections to the appropriate line terminals on the MDF 101. It is envisioned that future implementations will automate the connection and operation of the test unit 165 at the CO, for example by incorporation thereof into existing mechanized loop testing (MLT) equipment. A technician may connect the test unit 265 to the customer premises end of the line. Preferably, the carrier supplies the test unit 265 to the customer and instructs the customer to connect the test unit 265 to the customer end of the particular line $300_3$.

The two test units communicate test control information, back and forth, to facilitate one or more certification tests of the connected line. Each such test involves one of the units sending a known test pattern waveform over the line to the other unit. The other unit receives, samples and captures a waveform of the signal from the line. The unit receiving the signal analyzes the waveform of the received signal, to obtain the characteristic eigenvalues. If the eigenvalues bear appropriate relationships to the established thresholds for the desired service, the line characteristics are acceptable, and the loop is said to be "certified." If the eigenvalues do not show acceptable transmission characteristics on the line, the carrier has several options. One option is to attempt repairs on the line to improve performance. Another option is to attempt to find another line to the premises that is capable of supporting the desired digital service. As part of this later solution, the technicians would connect the test units 165, 265 to the second line $300_4$ to the premises $200_3$, as shown by the dotted lines in FIG. 3, and repeat the testing operation. If the second line is adequate, the technicians would reconnect the customer premises wiring at the NID $201_3$ and the wiring at the MDF 101 to provide the customer voice telephone service and the xDSL service over the second line $300_4$.

Figure 4:
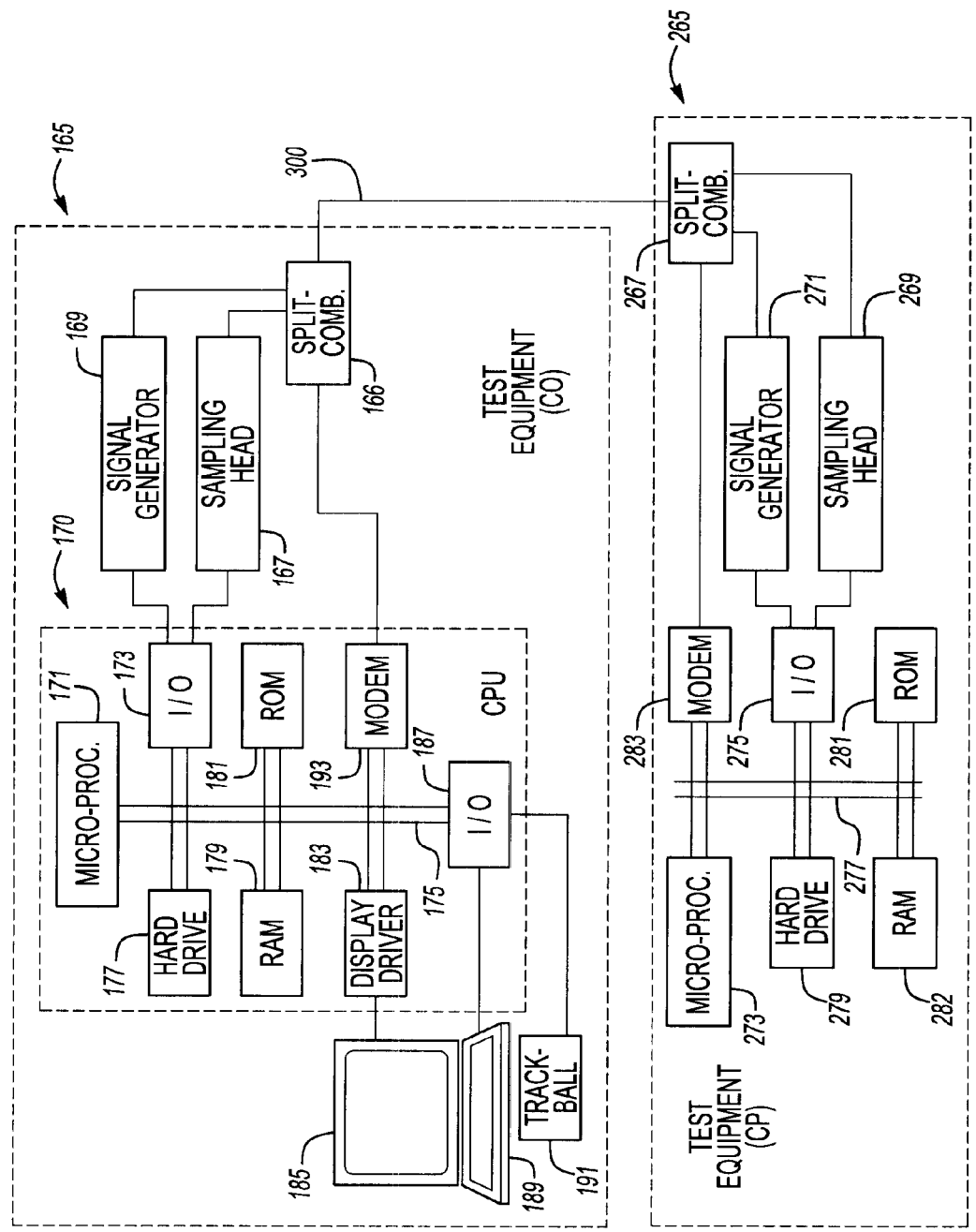
FIG. 4 is a functional block diagram, which illustrates the components of exemplary test units used to implement the invention, for example in the network of FIG. 3.

FIG. 4 shows the elements of the two test units 165, 265 in somewhat more detail. Consider first the test equipment 165 at the central office (CO). The test equipment 165 at the CO includes a splitter/combiner 166 coupled to the central office end of the line 300 under test. The splitter/combiner 166 is essentially similar to that used in an ATU-C type central office ADSL modem. For two-way testing of the higher frequency data channels, the splitter/combiner 166 provides connections to a sampling head 167 and a signal generator 169. The sampling head 167 digitizes received signals and captures digital data for a waveform sample of the received signals. The signal generator 169 selectively generates precise test waveform signals, for transmission via the splitter/combiner 166 to the line 300 under test.

The equipment 165 includes a programmable or central processing unit CPU 270. The CPU 170 essentially comprises the electronic components of a personal computer, workstation or the like. The CPU 170 controls all operations of the test equipment 165 and provides input and output mechanisms for a user interface for a technician. In an exemplary test procedure, discussed more below, the CPU 170 serves as the controller of the test, providing instructions to the CP test equipment 265 and receiving results from the CP equipment 265. The CPU 170 includes a micro-processor 171 acting as the programmable control element of the CPU. As such, the micro-processor 171 controls all operations of the CPU 170 and thus operations of the test equipment 165.

The main control element of the test equipment 165 is the PC type micro-processor 171 (e.g. Pentium II), or higher capacity programmable processing unit. The sampling head 167 and the signal generator 169 connect through an input/output (I/O) port 173 to a communications bus 175 of the computer system. The port and bus enable the micro-processor 171 to communicate with the signal generator 169 and the sampling head 167. For certain tests, the micro-processor may instruct the signal generator 169 to send a specific test waveform. For other tests, the micro-processor 171 receives a sample of a received signal waveform from the sampling head 167, for further processing in accord with the invention.

The CPU 170 within the test equipment 165 also includes a hard drive 177, for long term program and data storage. At least a portion of the control code for controlling the functions of the micro-processor 171 is stored in a read only memory (ROM) 181. Although not shown, the test equipment 165 also may include a non-volatile memory (EEPROM or Flash memory) storing programming code that may be modified to upgrade the operations of the equipment. The test equipment 165 also includes one or more working memories, such as the random access memory (RAM) 179, cache memory (not shown) and the like. The hard drive and the memories communicate with the micro-processor 171 via the bus 175. For program execution, program code is loaded from the hard drive 177 to the RAM 179. Data files, such as waveform parameters, may be loaded to the RAM with the program code or retrieved from the hard drive during program execution.

The computer system of the test equipment 165 also includes a voice-band modem 193. The modem 193 communicates with the micro-processor 171 via the bus 175. The line-side of the modem 193 connects through the voice-channel coupling of the splitter/combiner 166. The modem 193 enables the test equipment to send and receive test control data over the line 300 to and from the test equipment 265 operating at the customer premises.

The test equipment 165 includes a display driver 183 coupled to the communications bus 175. In response to instructions from the micro-processor 171, the driver 183 outputs signals to display various information on a monitor 185. The test equipment also includes a keyboard 189 and a cursor control, shown as a track-ball 191 by way of example. The keyboard 189 and trackball 191 connect through appropriate input/output (I/O) interface ports 187 to the bus 175. A technician operates the keyboard 189 and/or trackball 191 to input various information to the micro-processor 171. The keyboard, trackball and monitor represent elements providing a user interface under software control by the micro-processor 171. Those skilled in the art will recognize that the test equipment may incorporate elements providing other user interfaces, such as a touch sensitive LCD screen and/or "soft key" interface. Typically, the software causes the test equipment 165 to implement a form of graphical user interface.

Although the micro-processor 171 may run other programs, if the computer system provides other services or functionalities, the control program for the micro-processor 171 at least includes the routines necessary for providing the user interface and the routine for controlling the modem 193 for data communication with the customer premises test equipment. The control program for the micro-processor 171 also includes the routines necessary for sending and receiving the various test signals, for analysis of waveforms to derive the representative eigenvalues, and for comparison of the eigenvalues to reference thresholds.

The monitor 185, keyboard and trackball may be collated with the other elements of the unit 165, if the unit is essentially built on a PC or workstation platform. Alternatively only the CPU, signal generator, sampling head and splitter/combiner may be at the CO. The CPU would communicate with a remote terminal and/or host for purposes of control and user interface. Such a terminal for example might be in a network operations center.

The test equipment 265 is generally similar to that of the CO equipment 165, except that the customer premises (CP) equipment 265, preferably is built around or connected to a user's computer.

The customer premises test equipment 265 includes a splitter/combiner 267 for coupling to the customer premises end of a line 300 under test. The splitter/combiner 267 is essentially similar to that used in an ATU-R type remote ADSL modem. For two-way testing of the higher frequency data channels, the splitter/combiner 267 provides connections to a sampling head 269 and a signal generator 271. The sampling head 269 digitizes received signals and captures digital data for a waveform sample of the received signals.

The signal generator 271 selectively generates precise test waveform signals, for transmission via the splitter/combiner 267 to the line 300 under test. These three elements may be incorporated in a unit designed to plug in-between a user's PC and the line. If the user has purchased a modem capable of the desired ADSL service operations, the modem may serve the functions of these elements.

The sampling head 269 and the signal generator 271 connect through an input/output (I/O) port 275 to a communications bus 277. The port and bus enable the micro-processor 273 to communicate with the signal generator 271 and the sampling head 269. For certain tests, the micro-processor 273 may instruct the step signal generator 271 to send a specific test waveform. For another test, the micro-processor 273 receives a sample of a received waveform from the sampling head 269, for further processing in accord with the invention.

The computer in test unit 265 includes one or more working memories, such as the random access memory (RAM) 282, cache memory (not shown) and the like. At least a portion of the control code controlling the functions of the micro-processor 273 is stored in a read only memory (ROM) 281. Although not shown, the unit 265 also may include a non-volatile memory (EEPROM or Flash memory) storing programming code that may be modified to upgrade the operations of the test equipment 265. For program execution, program code is loaded from the hard drive 279 into the RAM 282. Data files, such as waveform parameters and threshold values, may be loaded to the RAM with the program code or retrieved from the hard drive during test program execution.

Depending on the type of test operations, the equipment 265 may include a number of other elements (not shown). For example, the equipment 165 may include a keyboard, a display, a mouse or trackball, and/or a printer, to provide a user interface and to enable output of reports. Preferably, the test equipment 265 is embodied in the form of a user's own PC, to which are connected the splitter/combiner, the signal generator and the sampling head.

It may be helpful now to go through a step-by-step discussion of a procedure to test a line, for example for the ADSL service desired by the customer at premises 200₃. Assume at this point that the technician wants to test the customer's active telephone line 300₃. As noted earlier, the technician and or user connect the test units 165 and 265 to the respective ends of the line. The technician at the central office uses the keyboard and/or trackball to control the test procedure. Initially, the two test units establish data communication with each other, using the modems 183, 293. As the test proceeds, the micro-processor 171 sends commands to in the CP test unit 265 via the modem communication, and the micro-processor 273 may send confirmation messages and certain test result data back via the modem link.

Assume now that the technician working with the CO test unit 165 first elects to test the broadband downstream channel capabilities, i.e. for the expected ADSL operation. The technician inputs data identifying the particular xDSL service and selects a downstream test. Specifically, the technician at the central office or other network location uses the keyboard 189 and/or the trackball 191 to select the downstream test for ADSL. In response, the micro-processor 171 generates a message, identifying the downstream ADSL test. The micro-processor forwards the message over the bus 175 to the modem 193, and that modem transmits the message as a modulated data signal through the splitter/combiner 166 to the telephone line 300. At the customer premises (CP), the modem 283 receives the message from the line 300 via the splitter/combiner 267. The modem 283 demodulates the message and supplies it over the bus 277 to the micro-processor 273. The micro-processor 273 analyzes the received message and determines that the test unit 165 will send a test waveform over the line 300 to the CP unit. The micro-processor 273 initializes the sampling head 269, and sends a "ready" message back through the modem link to the micro-processor 171 in the test unit 165 at the CO.

The micro-processor 171 retrieves waveform parameter data from storage and sends a command with that data to the signal generator 169, via the bus 175 and the I/O port 173. In response, the signal generator 169 outputs a precise test waveform for the upstream channel for the selected ADSL service. For example, to test the downstream transmission band for an ADSL service, the generator 169 might transmit a white noise signal having a bandwidth corresponding to that of the band under test. If the ADSL service uses frequency division, the signal band would cover the frequencies used for all downstream communication. If the ADSL service uses Echo Cancellation, the test signal band actually might cover the entire digital communication band, i.e. the downstream broadband with its overlap of the narrower upstream band. The generator 169 supplies the test waveform signal to the downstream data input of the splitter/combiner 166, for transmission through the line 300 to the customer premises.

The line 300 carries the test waveform signal from the CO to the customer premises. The signal will be corrupted to some extent by the characteristics of the particular line 300. For example, there may be a general attenuation or attenuation in specific frequency portions of the downstream channel, for example due to the presence of a load coil on the line. There may be deleterious effects due to excessive capacitance and resistance on the line, for example due to extended wiring connected on the circuit by a bridged tap. Alternatively, there may be cross-talk or some other disruptive interference from outside sources. If the circuit is in relatively good condition, these various effects will be minimal and the transmitted signal will reach the customer premises with little corruption.

At the customer premises, the splitter/combiner 267 passes the spectrum of the downstream ADSL data communications to the sampling head 269. In this case, that means that the sampling head 269 receives the test waveform as corrupted by transport thereof through the customer's line 300. The sampling head 269 digitizes samples of the waveform on the line, and captures the digitized samples for a complete waveform representative of the signal received from the telephone line 300. The sampling head 269 supplies the complete set of digital waveform samples for the test to the micro-processor 273, via the I/O port 275 and the bus 277.

The micro-processor 273 could perform the complete eigenvalue analysis. However, if implemented in the user's PC, the carrier has no way to know in advance if the particular user has a PC with sufficient processor power to perform the entire calculation in a timely manner. Preferably, the micro-processor performs little or no processing on the digital samples and returns data to the CO test unit 165, to complete the processing. For example, using the eigenvalue calculation technique outlined above, the CPU in the test unit 265 could be programmed to Fourier transform the digitized waveform signals and return the transform values to the CO test unit. As discussed above, these transform values represent the discrete time channel impulse response of the line under test with respect to the tested frequency band, in this case the downstream channel for ADSL. Alternatively, the test unit 265 could simply transmit back the digitized values of the received waveform. The advantage of sending the transform values is that the transform values represent a relatively small amount of data for transmission via the low-speed modems as compared to the actual digital samples of the received signal. In either case, the micro-processor forwards the data through the bus 277 to the modem 283, which modulates the data and sends it through the splitter/combiner 267 and the line 300 to the CO test equipment 165.

At the CO, the combiner/splitter 166 supplies the modulated signal to the modem 193. The modem 193 demodulates the data and forwards it over the bus 175 to the micro-processor 171. The CPU 170 is programmed in such a manner that the micro-processor now calculates the eigenvalues from the received data, that is to say, from the raw data or from the Fourier transform values. The programming indicates the band of frequencies covered by the particular test, e.g. the ADSL downstream band, and the program calculates the set of eigenvalues sized to give appropriate resolution for judging the acceptability of that band.

At this point, the micro-processor 171 can generate signals to produce a display of the eigenvalues for the downstream transfer function of the line on the monitor 185. The CPU 170 also is programmed with eigenvalue thresholds for the various communication services. In our example, the eigenvalues represent the transfer function with respect to the broadband data channel for an ADSL-type communication service. The micro-processor 171 retrieves the threshold values corresponding to the downstream ADSL channel from storage. The micro-processor 171 compares the threshold values to the eigenvalues derived from the testing operation. If the eigenvalues bear the desired relationship to the thresholds, for example, if the values exceed all of the thresholds, the micro-processor generates a display of that successful result on the monitor 185.

At this point, if the test for the downstream channel is sufficient for certification and the test was successful, the technician can certify the subscriber's line 300 for the desired ADSL service. If a user is on-line at the customer premises, the test unit 165 can send a notice of certification over the low-speed modem link, and the user's PC could display or announce the successful completion of the test.

As noted, the CO test equipment 165 can display the eigenvalues on the monitor 185. The CPU 170 can also provide a variety of software tools for analysis of those values, particularly in the situation where the values do not meet the thresholds for the desired service. The display may show the margin that each value differs from the threshold. The software may provide displays of corrective options. The technician may be able to communicate over the carrier's business data network (not shown), to access records regarding the particular line. For example, this communication might allow the technician to determine the nearest terminal connection of the line and the history of past tapping from the line, to thereby help find and eliminate any undesirable bridged taps.

The test units illustrated in FIG. 4 support testing of both downstream and upstream communications over the subscriber's line. The upstream transfer function may be inferred from the downstream test. The embodiment of FIG. 4 actually enables test in both directions. For example, if the line test indicates acceptable capability for the downstream broadband channel of ADSL, it still may be desirable to test the upstream channel.

To initiate this second test, the technician operating the CO test equipment 165 uses the keyboard 189 and/or the trackball 191 to select the upstream test for ADSL. In response, the micro-processor 171 generates a message, identifying the upstream ADSL test. The micro-processor forwards the test message over the bus 175 to the modem 193, and that modem transmits the message as a modulated data signal through the splitter/combiner 166 to the telephone line 300. At the customer premises, the modem 283 receives the message from the line 300 via the splitter/combiner 267. The modem 183 demodulates the message and supplies it over the bus 277 to the micro-processor 273. The micro-processor analyzes the received message and determines that the test unit 265 is to send a test waveform over the line 300 to the CO and recognizes the service and band involved in the particular test. The micro-processor 173 may send an acknowledgment back to the test unit 165 via the low-speed modems.

The micro-processor 273 retrieves waveform parameter data from storage and sends a command with that data to the signal generator 271, via the bus 277 and the I/O port 275. In response, the signal generator 271 outputs a precise test waveform for the upstream channel for the selected ADSL service. In the present example, to test the upstream transmission band for an ADSL service, the generator 269 might transmit a white noise signal having a bandwidth corresponding to that of the band under test. The generator 271 supplies the test waveform signal to the upstream input of the splitter/combiner 267, for transmission through the line 300. The line 300 carries the test waveform signal from the customer premises to the CO. As with the downstream transmission, the transport of the signal upstream over the twisted wire line in the example will cause some detectable amount of signal degradation.

At the CO, the splitter/combiner 166 passes the spectrum of the upstream ADSL communications to the sampling head 167. In this case, that means that the sampling head 167 receives the test waveform as corrupted by transport thereof through the customer's line 300. The sampling head 167 digitizes samples of the waveform on the line, and captures the digitized samples for a complete waveform representative of the signal received from the telephone line 300. The sampling head 267 supplies the complete set of digital waveform samples for the test to the CPU 170. Within the CPU, the digital data for the samples pass through the I/O port 173 and over the bus 175 to the micro-processor 171, for further processing. The micro-processor 171 executes the procedure for analyzing the measured waveform, to determine the eigenvalues for the transfer function of the line 300 with respect to the upstream channel of the ADSL service. At this point, the micro-processor 171 can generate signals to produce a display of the eigenvalues on the monitor 185.

The micro-processor 171 retrieves the threshold values corresponding to the downstream ADSL channel from storage. The micro-processor 171 compares the threshold values to the eigenvalues derived from the upstream testing operation. If the eigenvalues bear the desired relationship to the thresholds, for example, exceed all of the thresholds, the micro-processor generates a display of that successful result on the monitor 185.

At this point in our example, the system has successfully tested both the broadband downstream channel and the upstream channel, for the selected ADSL service. The technician can certify the subscriber's line 300 for the desired ADSL service. If a user is on-line at the customer premises, the test unit 165 can send a notice of certification over the low-speed modem link, and the user's PC could display or announce the successful completion of the test.

As with the downstream test, the test equipment 165 can display the eigenvalues from the upstream test on the monitor 185. The CPU 170 can also provide a variety of software tools for analysis of any values indicating problems with regard to the upstream transmission test.

From the above discussion, it should be apparent that the systems and methodology of the present invention enable carrier technicians to test the transmission characteristics of lines, to support digital communications in either direction over a transmission line. The examples described enable the technician to certify that the line will support a particular grade of xDSL service. If a line does not support a desired service the carrier can take some action. For example the technician can test another line. Alternatively, analysis of the line may show that it supports a lower grade of service that desired by the customer. The carrier and the customer may negotiate and agree to use of the lower grade DSL service on the line. Alternatively, the carrier can initiate action to upgrade the line characteristics to support the desired service and then retest for certification.

The invention also facilitates testing during in-service xDSL operations over the customer's lines. Over time, line conditions change for many different reasons. A line that initially tested as adequate for a particular service may deteriorate so that it no longer supports the service. If a customer reports a trouble with an existing xDSL service, the carrier can retest the line. The eigenvalues determined in the test procedure provide useful information in determining if the fault is related to the line. If the line no longer supports the desired service, again, the carrier may initiate corrective action or may switch the customer to another line circuit.

Persons skilled in the art will recognize that a wide range of enhancements of the exemplary embodiments described in detail above fall within the spirit and scope of the concepts of the present invention. For example, the disclosed embodiments utilized specialized test equipment at both ends of the line under test. Future enhancements will rely on the customer's ADSL modem and computer to send test signals over the line to centralized test equipment operated by the carrier's technicians. Alternatively, the digital signal processing and software capability of the ADSL modem and PC might enable the PC to perform an eigenvalue analysis based on a downstream signal from an ATU-C.

As another example, the embodiment of FIG. 4 conducted tests on the upstream and downstream transfer functions by transmitting corresponding test signals in both directions, exactly the same as if the actual DSL modems were operating over the line. Alternatively, testing from one end, preferably the central office end, could analyze the transfer function for both directions. The characteristic transfer function of a twisted wire pair line is the same in both directions. One approach is to transmit a test waveform covering all bands of interest, e.g that for the broadband signal and that for the slower upstream signal, in one direction. This transmission could go from the CO to the CP, or vice versa. The resulting eigenvalues characterize the transfer function with respect to all frequencies involved in the xDSL service. Another alternative is to determine the eigenvalues for the transfer function for one direction, e.g. those for, the broadband channel, and then infer the transfer function for the other direction and frequency band from the actual test results and knowledge of the characteristics of twisted pair wiring.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A system for testing a line of a communication network for a digital subscriber line service, comprising:

a test waveform generator, for connection to a transmit-side of the line;

a waveform sampler, for connection to a receive-side of the line, for sampling a test waveform received through the line from the generator; and a processor, coupled to the waveform sampler and responsive to the sample of the received test waveform, for determining a set of eigenvalues characterizing a transfer function of the transmission line and for comparing the eigenvalues to threshold values corresponding to an acceptable transfer function of the transmission line.

2. A system as in claim 1, wherein the test waveform generator comprises a generator for generating a waveform corresponding to the digital subscriber line service selected from waveforms corresponding to a plurality of digital subscriber line services available on the communication network.

3. A system as in claim 1, wherein the processor comprises a programmable central processing unit.

4. Apparatus comprising in combination:

a communication network for providing telephone service and digital subscriber line data service over a plurality of subscriber line circuits; and line test means, selectively coupled to one of the subscriber line circuits, for measuring signals transmitted over the one subscriber line circuit, determining a set of eigenvalues in response to the signal measurement and comparing the set eigenvalues to threshold values characterizing an acceptable line transfer function for the digital subscriber line data service.

5. Apparatus as in claim 4, wherein the digital subscriber line data service comprises an asynchronous digital subscriber line (ADSL) service.

6. Apparatus as in claim 4, wherein the line test means comprises a test waveform generator for transmission of a test waveform over the one subscriber line circuit, and a waveform sampler for digitizing signals from the one subscriber line circuit and capturing digital samples for a waveform received from the one subscriber line circuit.

7. Apparatus as in claim 6, wherein the line test means further comprises a computer system in communication with the waveform sampler for processing digital samples corresponding to the captured digital samples to determine the eigenvalues.

8. Apparatus as in claim 4, wherein the communication network comprises a local exchange carrier telephone network.

9. Apparatus as in claim 8, wherein the subscriber line circuits comprise twisted pair telephone line circuits.

* * * * *